Figure 3:
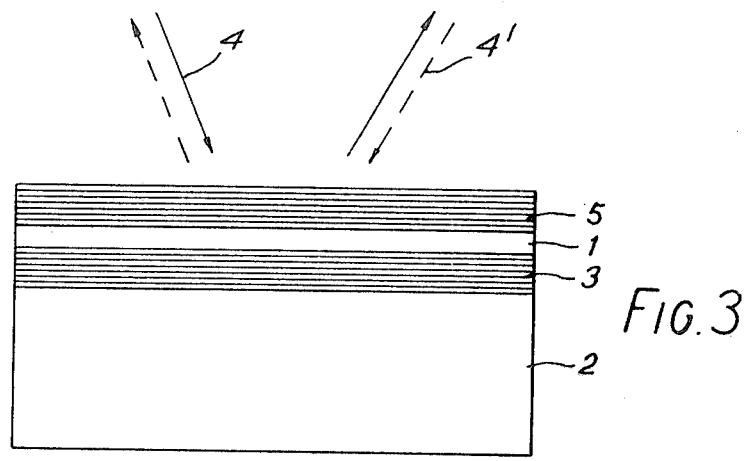

United States Patent

Carter et al.

[11] 4,246,549
[45] Jan. 20, 1981

[54] MAGNETO-OPTICAL PHASE-MODULATING DEVICES

[75] Inventors: Walter S. Carter, Bracknell; Richard B. Inwood, Crowthorne, both of England

[73] Assignee: Sperry Rand Limited, Bracknell, England

[21] Appl. No.: 947,968

[22] Filed: Oct. 2, 1978

[30] Foreign Application Priority Data

Oct. 4, 1977 [GB] United Kingdom ............... 41151/77

[51] Int. Cl.$^3$ ............................................... H01S 3/10
[52] U.S. Cl. ........................ 331/94.5 M; 331/94.5 C; 350/355; 356/350
[58] Field of Search .................. 331/94.5 M, 94.5 C; 350/355, 353, 96.15, 96.29; 252/62.57, 62.63; 356/350

[56] References Cited

U.S. PATENT DOCUMENTS

| | | | |
|---|---|---|---|
| 3,495,189 | 2/1970 | LeCraw | 331/94.5 M |
| 3,650,601 | 3/1972 | Bierlein | 350/355 |
| 3,811,096 | 5/1974 | Dillon, Jr. et al. | 331/94.5 M |

OTHER PUBLICATIONS

Hepner et al., "Magnetooptic Effects in Garnet Thin Film Wave-Guides"; *Applied Optics,* vol. 14, No. 7, pp. 1479–1481, Jul. 1975.

*Primary Examiner*—William L. Sikes
*Assistant Examiner*—Leon Scott, Jr.
*Attorney, Agent, or Firm*—Howard P. Terry

[57] ABSTRACT

The invention provides a magneto-optical phase-modulating device employing either the transverse Kerr magneto-optic effect or the Faraday magneto-optic effect and embodying a magneto-optic layer (1) of a ferromagnetic or ferrimagnetic garnet type material which gives rise to an improved performance over known devices. Examples of the garnet type material which may be employed are a bismuth doped garnet, praseodymium and a garnet type material of the group known as orthoferrite materials.

The invention finds particular application in laser gyroscopes.

34 Claims, 6 Drawing Figures

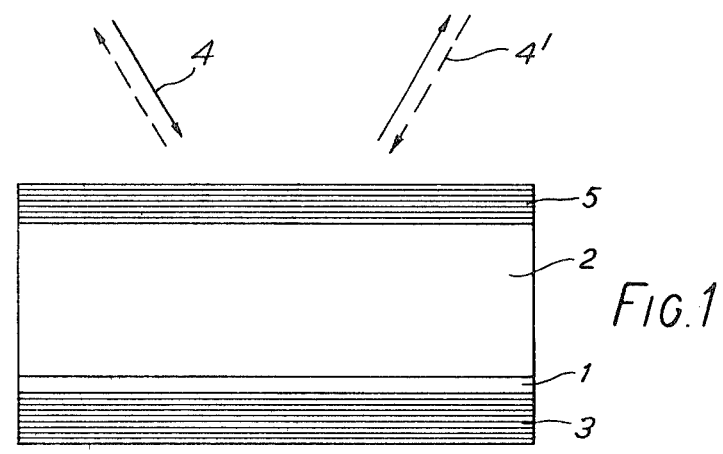
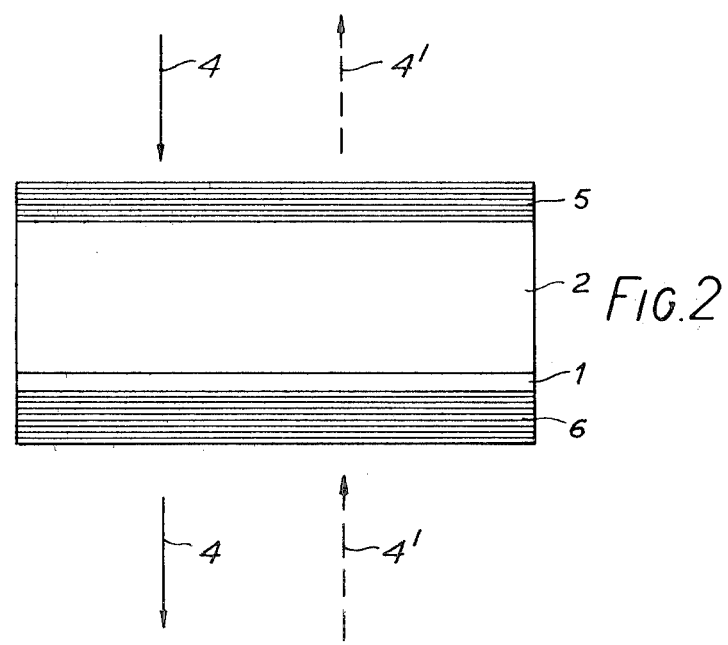

MAGNETO-OPTICAL PHASE-MODULATING DEVICES

This invention relates to magneto-optical phase-modulating devices employing the Kerr or Karday magneto-optic effect and operable to modulate light incident thereon. These devices may be employed in ring lasers and the invention will be discussed in the main with reference to ring lasers, and more specifically laser gyroscopes, but it is to be understood that it is not limited to this particular application.

As is well known, a ring laser employs two beams of light transmitted in opposite directions around the ring or so-called cavity. In an ideal ring laser, the frequency difference between the beams of light is zero when the ring is stationary but moves from zero when the ring is rotated about its axis, the frequency difference being proportional to the angular rotation rate of the cavity. Thus a ring laser is capable of functioning as a rate gyroscope. In practical ring lasers, however, there are many effects that degrade the performance, the majority of these are linked in some way to the amount of light that is lost in traversing the cavity. This most important effects are lock-in, mode pulling and mode pushing. Lock-in is caused by light scattered from each beam interacting with the opposite beam, suppressing the frequency difference at low rotation rates, and making it non-linear at just above the lock-in frequency.

One method of avoiding the lock-in problems is to impart a bias to the ring laser such that a non-reciprocal phase shift is introduced to the contradirectional light beams. Various biasing techniques have been proposed ranging from a mechanical arrangement (known as "dither"), which oscillates the entire ring laser at a small amplitude substantially about the geometric centre of the cavity, to a magnetic arrangement. The magnetic arrangements fall in two categories, namely Faraday cells and magnetic mirrors. In the Faraday cell biasing devices, a paramagnetic material, transparent to the laser wavelength, is inserted in the cavity in the paths of the two light beams. This arrangement suffers the disadvantage that high quality, and hence expensive, optical components have to be employed and furthermore, these components may give rise to increased light scatter which therefore adds to the lock-in problem.

As regards the magnetic bias mirror, this replaces one of the usual three "corner" mirrors of the ring laser and an example is disclosed in British Pat. No. 1,406,730. In this example, the mirror comprises a ferromagnetic layer formed on a substrate and overcoated with layers of dielectric materials to give the ferromagnetic layer sufficient reflectivity to produce a ring laser of a sufficient quality for gyroscopic purposes. In use, a magnetic field is applied to the ferromagnetic layer in the plane of the mirror and perpendicular to the plane of the laser cavity so as to produce the transverse Kerr magneto-optic effect which results in a phase difference being imparted to he contradirectional light beams in addition to the created by any rotation of the ring laser. As well as introducing the required phase difference, the transverse Kerr magneto-optic effect introduces an amplitude difference between the two light beams by way of a non-reciprocal reflectivity of the mirror. This has a detrimental effect on the performance of a laser gyroscope and needs to be minimized for optimum gyroscope performance. To this end, use is made of a layer of a dielectric material immediately next to the ferromagnetic layer, the dielectric layer (termed the "control layer") being of a modified thickness compared with the adjacent dielectric layers which normally have a quarter-wave optical thickness.

The advantages of the magnetic bias mirror are that it is non-mechanical, it can be subjected to fast switching (of the order of one microsecond) as regards the magnetic field applied to the ferromagnetic layer (periodically to reverse the bias to avoid the necessity of measuring the latter accurately), and the bias amplitude does not depend on the applied magnetic field once the saturation moment of the ferromagnetic layer has been achieved. However, the known magnetic mirrors suffer the disadvantage that to date, only iron from the range of ferromagnetic materials has been employed therein and iron has a relatively low reflectivity, thus necessitating the use of a large number of dielectric layers to bring the reflectivity of the mirror as a whole above the loss threshold of the laser cavity. Unfortunately, the greater the number of dielectric layers, the smaller the amount of light reaching the ferromagnetic layer whereby the phase difference imparted to the contradirectional light beams by the mirror is reduced. Thus the bias to loss ratio of a ring laser is a function of the number of dielectric layers employed. Since iron has a relatively low reflectivity and only a moderate magneto-optical effect, it does not have a high enough bias to loss ratio for a magnetic mirror embodying this material to be used in other than low grade laser gyroscopes. Furthermore, because iron tends to oxidise thereby making it unstable with the result that the characteristics of the known magneto-optic device may change with time which is undesirable.

It is the object of the present invention to provide a magneto-optical phase-modulating device which is economic in manufacture and which, when employed in a magentic bias mirror, reduces or obviates the disadvantages of known magnetic bias mirrors discussed above.

According to one aspect, the present invention provides a magneto-optical phase-modulating device employing the transverse Kerr magneto-optic effect and operable to modulate light incident thereon, the device comprising a magneto-optic layer of a ferromagnetic or ferrimagnetic garnet type material and a reflective layer, in use p polarised light being incident first upon the magneto-optic layer and then on the reflective layer.

Two particular garnet materials which are preferred for the magneto-optic layers are a bismuth doped garnet having the formula

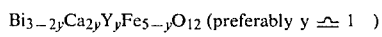
$Bi_{3-2y}Ca_{2y}Y_yFe_{5-y}O_{12}$ (preferably $y \simeq 1$)

and praseodymium having the formula

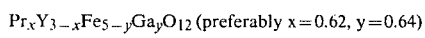
$Pr_xY_{3-x}Fe_{5-y}Ga_yO_{12}$ (preferably $x = 0.62$, $y = 0.64$)

One alternative garnet type material which may be used as the magneto-optic layer is that in the group known as orthoferrite materials.

The reflective layer may be a single layer of a highly reflective material such as a dielectric or may be a composite layer comprising, for example, alternate layers of two different dielectric materials which combine to provide a highly reflective layer or stack. By "highly reflective" is meant a reflectivity of upwards of 85%, preferably upwards of 95%.

In some circumstances in a laser gyroscope application it may be desirable to limit the reflection of the contradirectional light beams from the top surface of the magneto-optic layer (i.e. from the air/magnetic-optical layer interface) so as to allow a greater proportion of each beam to interact with the magneto-optic layer to increase the magneto-optic effect and hence to increase the bias imparted by the mirror. This limitation can be effected by providing an anti-reflective layer on the magneto-optic layer, the light beams being, in use, incident upon the former before the latter.

In a practical embodiment of the present invention the reflective layer is deposited on a substrate such as glass by a vacuum deposition or other method, the magneto-optic layer is deposited on the reflective layer by vacuum deposition, and finally, the anti-reflective layer, if employed, is deposited on the magneto-optic layer by vacuum deposition or other method.

According to another aspect, the present invention provides a magneto-optical phase-modulating device employing the Faraday magneto-optic effect and operable to modulate light incident thereon, the device comprising a magneto-optic layer of a ferromagnetic or ferrimagnetic garnet type material and a first anti-reflective layer.

The use of an anti-reflective layer instead of the reflective layer discussed above enables light to pass through the device and hence one application of the latter is in a Fardaday cell for use in a ring laser. A further anti-reflective layer may be provided on the magneto-optic layer as with the other device and the various layers may be formed as discussed above. In order to improve further the transmission of light through the device, an anti-reflective layer may be provided at each interface of the device, the purpose of each anti-reflective layer being to provide an optical match between the two interfacing materials.

Figure 4:
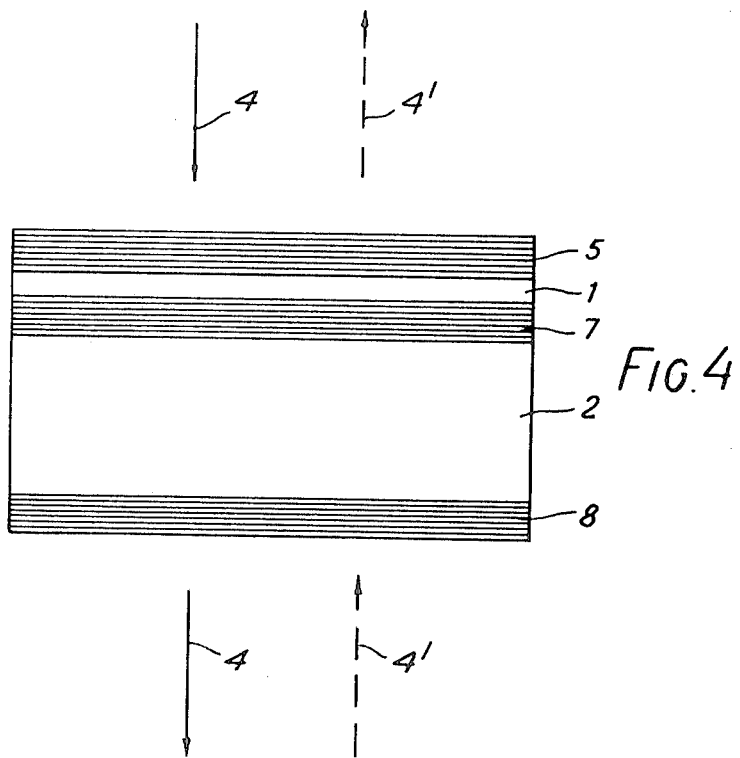
Figure 5:
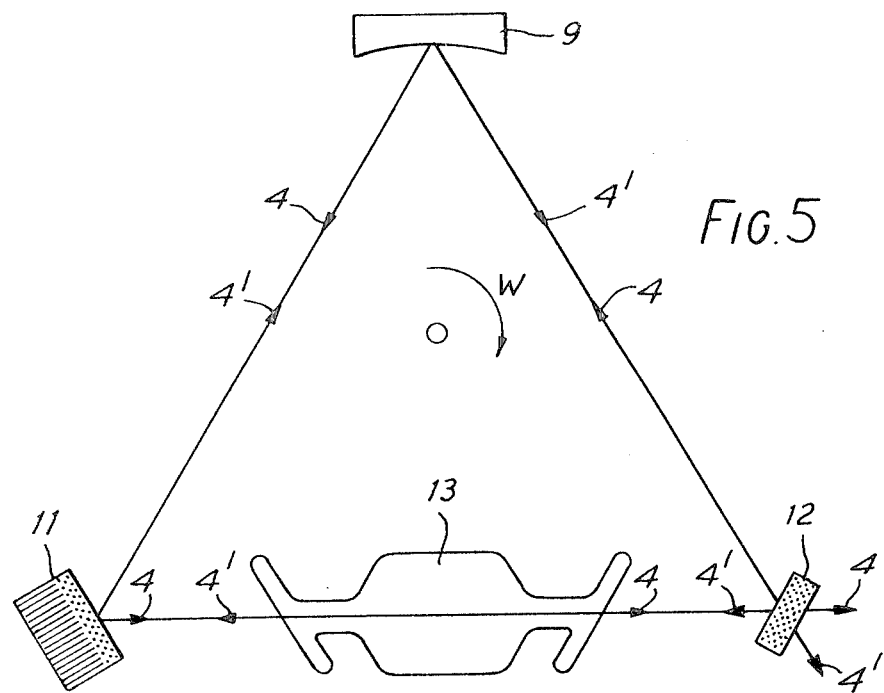
Figure 6:
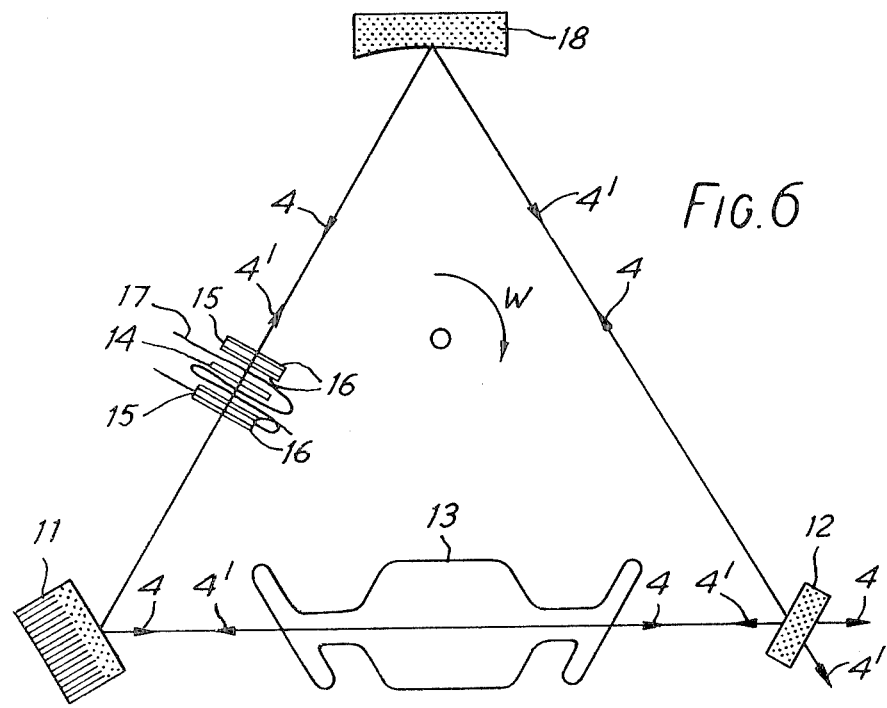

Magneto-optical phase-modulating devices in accordance with the invention will now be described in greater detail, by way of example, with reference to the accompanying drawings, in which:

FIGS. 1 to 4 are respective diagrammatic representations of four different devices in accordance with the invention, FIG. 5 is a schematic layout of a laser gyroscope in which the device of FIG. 1 or 3 may be employed, and FIG. 6 is a schematic layout of a laser gyroscope in which the device of FIG. 2 or 4 may be employed.

Referring to FIG. 1, this embodiment of the invention is in the form of a magnetic mirror and comprises a magneto-optic layer 1 in the form of a layer of a ferromagnetic garnet approximately 500 Angstroms thick. This layer is produced by using the liquid phase epitaxy (LPE) method of deposition which necessitates the use of a substrate of a non-ferromagnetic material having substantially the same lattice constant and crystalline structure as the garnet material used. Desirably, the substrate also has a low coefficient of absorbtion with respect to light. In the present case, single crystal garnet is used for the magneto-optic layer 1, specifically a bismuth doped having the formula

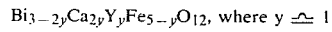

$Bi_{3-2y}Ca_{2y}Y_yFe_{5-y}O_{12}$, where $y \simeq 1$

The substrate on which the layer 1 is LPE deposited is shown in FIG. 1 at 2 and is in the form of single crystal gadolinium gallium garnet about 1 mm thick.

Behind the magneto-optic layer 1, with respect to incident light 4, 4', a conventional highly reflective layer 3 is provided in the form of a multilayer stack of two dielectric materials disposed alternatively. The two dielectric materials are magnesium fluoride and zinc sulphide and they are deposited using vacuum deposition or any other method. In order to limit the amount of incident light 4,4' reflected from the air/layer 1 interface, a conventional anti-reflective layer 5 is provided on the substrate 2. The anti-reflective layer 5 is also in the form of a multilayer stack and is comprised of alternating layers of magnesium fluoride and zinc sulphide, as is the reflecting layer 3, vacuum deposition or other method again being used.

The thicknesses of the deposited layers 1, 3 and 5 may be controlled using the conventional optical monitoring technique, for example, so as to provide optimum thicknesses of the various materials. It may be possible to dispense with the so-called "control layer", which is the layer of reflective dielectric material of the layer 3 immediately next to the substrate 2, by providing the magneto-optic layer 1 with a predetermined thickness. The control layer, or the predetermined magneto-optic layer, adjusts the relative phases of the multiple reflections at the two interfaces to eliminate the amplitude difference and enhance the phase difference.

In the device of FIG. 1, the relatively thick substrate 2 is not placed between the magneto-optic layer 1 and the reflective layer 3 because this would so increase the optical path length of the light reflected from the layer 3 that maximum coherence with the light reflected at the magneto-optic/substrate interface would not be achieved.

FIG. 2 illustrates a device essentially similar in construction and manufacture as that of FIG. 1 except that the reflective layer 3 is replaced by a further anti-reflective layer 6' similar to the anti-reflective layer 5. In this way, the device is changed from a magnetic mirror to a device essentially transparent to the incident light 4.

There may be a tendency in the devices of FIGS. 1 and 2 for the substrate 2 to destroy the coherence between light reflected by the reflective layer 3 and that reflected by the magneto-optic layer 1. Therefore, a preferred alternative to the device of FIG. 1 is shown in FIG. 3 in which the substrate 2 takes no part in the operation of the device. The highly reflective layer 3 is formed on the substrate 2, which may be glass, as already described but the magneto-optic layer 1 is a polycrystalline garnet (bismuth doped garnet, for example) formed in a layer by vacuum deposition, whereby it can be deposited directly on the reflective layer 3. The anti-reflective layer 5 is then deposited on the magneto-optic layer 1.

FIG. 4 illustrates a device essentially similar in construction and manufacture to that of FIG. 3 except that it is converted from a mirror to an optically transparent device by replacing the reflective layer 3 by a further anti-reflective layer 7. A still further anti-reflective layer 8 is provided on the outside main surface of the substrate 2.

The magnetic mirrors of FIGS. 1 and 3 may be employed in a laser gyroscope as illustrated in FIG. 5. The magnetic mirror, indicated at 9, forms one of the three corner mirrors in the conventional manner, and other two mirrors being a servoed mirror 11 and an output mirror 12. A laser discharge tube 13 completes the laser cavity, the tube producing two contradirectional beams of p polarised light 4,4' (light polarised parallel to the plane of the laser cavity) the reference numerals 4,4' being used in FIGS. 1 to 4 to represent two beams of incident light appropriate to the use of the devices in laser gyroscopes. In use, a magnetic field is applied to the magneto-optic layer 1 of the mirror 9 in the plane of the mirror and at right angles to the plane of the laser cavity, i.e. in a plane at right angles to the plane of the paper when looking at FIG. 5. This magnetic field produces the transverse Kerr magneto-optic effect or the meridional Kerr magneto-optic effect (not to be confused with the Kerr electro-optic effect), whereby light reaching the magneto-optic layer 3 interacts therewith and a non-reciprocal phase change is imparted to the two beams 4,4' which is equivalent to a difference in the optical path lengths thereof, and therefore produces the desired bias to overcome the problem of lock-in. The difference in path lengths created either by the basis or the bias plus any angular rotation W imparted to the cavity is detected by means (not shown) disposed to receive portions of the light beams 4,4' extracted by the output mirror 12.

The optically transparent devices of FIGS. 2 and 4 may be used in a Faraday cell employed in a laser gyroscope as illustrated in FIG. 6, the device being indicated at 14 between two quarter-wave plates 15 which are required to change the plane polarised light from the discharge tube 13 to circularly polarised light and which are provided with anti-reflective layers 16. Means, such as a coil 17, are provided to apply, in use, a magnetic field to the magneto-optic layer 1 of the device 14, which field is colinear with the directions of propagation of the light beams 4,4'. This magnetic field produces, in accordance with the Faraday effect, a non-reciprocal optical path length change to the circularly polarised light which is incident on the device 14 and which is produced by the quarter-wave plates 15 acting on the respective beams 4,4'. Compared with FIG. 5, the corner mirror 18 is a standard curved mirror, as opposed to a magnetic mirror.

One disadvantage to the application of the Faraday effect is that it requires the addition of at least three solid components—the two quarter-wave plates 15 (to transform linearly polarised light into circularly polarised and vice-versa) and the Faraday element. Such elements are extremely difficult to make with a sufficiently high optical finish to ensure that the scattering they introduce in the cavity is small in comparison with that introduced by the corner mirrors. Another disadvantage is that of having to stabilise the magnetic field, when using a paramagnetic material, because the magnetization is proportional to the applied field, but this can be overcome by using the transparent device 12 of which the magneto-optic layer can be saturated.

The material chosen for the magneto-optical layer 1 of the illustrated devices may be other than the bismuth doped garnet having the quoted formula and may be any other garnet, such as praseodymium for example, or a garnet type material such as belong to the orthoferrite group of materials.

It will be understood that the number of layers of dielectric material used in the various reflective and antireflective layers depends on the required characteristics of the same.

We claim:

1. A device employing the transverse Kerr magneto-optic effect for phase modulating p-polarized light incident thereto comprising:

a magneto-optic layer of bismuth doped garnet having the formula $Bi_{3-2y} Ca_{2y} Y_y Fe_{5-y} O_{12}$ where preferably $y \simeq 1$;

a reflective layer positioned adjacent to the magneto-optic layer such that the p-polarized light is first incident to the magneto-optic layer and therefrom to the reflective layer.

2. A device according to claim 1 and further comprising a transparent substrate on which is disposed the magneto-optic layer with the reflective layer disposed on the magneto-optic layer.

3. A device according to claim 1, and further comprising a substrate on which is disposed the reflective layer, with the magneto-optic layer disposed on the reflective layer.

4. A device according to claims 1, 2, or 3, wherein an anti-reflective layer is provided on the exterior surface to which the p-polarized light is first incident.

5. A device according to claim 4, wherein the anti-reflective layer is in the form of a single layer of a dielectric material.

6. A device according to claim 4, wherein the anti-reflective layer is of composite form and comprises a plurality of alternate layers of two different dielectric materials.

7. A device according to claim 6, wherein the two dielectric materials are magnesium fluoride and zinc sulfide.

8. A device according to claim 1, wherein $y \simeq 1$.

9. A device according to claims 1, 2 or 3, wherein the reflective layer is in the form of a single layer of a dielectric material.

10. A device according to claims 1, 2, or 3, wherein the reflective layer is of composite form and comprises a plurality of alternate layers of two different dielectric materials.

11. A device according to claim 10 wherein the two dielectric materials are magnesium fluoride and zinc sulfide.

12. A device employing the transverse Kerr magneto-optic effect for phase modulating p-polarized light incident thereto comprising:

a magneto-optic layer of praseodymium having the formula $Pr_x Y_{3-x} Fe_{5-y} Ga_y O_{12}$ where preferably $x=0.62$ and $y=0.64$; and a reflective layer positioned adjacent to the magneto-optic layer such that in operation the p-polarized light is first incident to the magneto-optic layer and therefrom to the reflective layer.

13. A device according to claim 12, wherein $x=0.62$ and $y=0.64$.

14. A device according to claim 12 further comprising a transparent substrate on which is disposed the magneto-optic layer with the reflective layer disposed on the magneto-optic layer.

15. A device according to claim 12 further comprising a substrate on which is disposed the reflective layer, with the magneto-optic layer disposed on the reflective layer.

16. A device according to claims 12, 14 or 15 wherein an anti-reflective layer is provided on the exterior surface to which the p-polarized light is first incident.

17. A device according to claim 16 wherein the anti-reflective layer is in the form of a single layer of a dielectric material.

18. A device according to claim 16 wherein the anti-reflective layer is of composite form and comprises a plurality of alternate layers of two different dielectric materials.

19. A device according to claim 18 wherein the two dielectric materials are magnesium fluoride and zinc sulfide.

20. A device according to claims 12, 14 or 15 wherein the reflective layer is in the form of a single layer of a dielectric material.

21. A device according to claims 12, 14 or 15 wherein the reflective layer is of composite form and comprises a plurality of alternate layers of two different dielectric materials.

22. A device according to claim 21 wherein the two dielectric materials are magnesium fluoride and zinc sulfide.

23. A laser gyroscope having laser cavity defined by a servoed mirror, an output mirror and a mirror embodying a magneto-optical phase modulating device wherein said phase modulating device comprises:
- a magneto-optic layer of bismuth doped garnet having the formula $Bi_{3-2y} Ca_{2y} Y_y Fe_{5-y} O_{12}$ where preferably $y \simeq 1$; and
- a reflective layer positioned adjacent to the magneto-optic layer such that the p-polarized light is first incident to the magneto-optic layer and therefrom to the reflective layer.

24. A laser gyroscope having laser cavity defined by a servoed mirror, an output mirror and a mirror embodying a magneto-optical phase modulating device wherein said phase modulating device comprises:
- a magneto-optic layer of praseodymium having the formula $Pr_x Y_{3-x} Fe_{5-y} Ga_y O_{12}$ where preferably $x = 0.62$ and $y = 0.64$; and
- a reflective layer positioned adjacent to the magneto-optic layer such that in operation the p-polarized light is first incident to the magneto-optic layer and therefrom to the reflective layer.

25. A device employing the transverse Kerr magneto-optic effect for phase modulating p-polarized light incident thereto comprising:
- a magneto-optic layer of a material chosen from the group of materials known as orthoferrites; and
- a reflective layer positioned adjacent to the magneto-optic layer such that in operation the p-polarized light is first incident to the magneto-optic layer and therefrom to the reflective layer.

26. A device according to claim 25 further comprising a transparent substrate on which is disposed the magneto-optic layer with the reflective layer disposed on the magneto-optic layer.

27. A device according to claim 25 further comprising a substrate on which is disposed the reflective layer, with the magneto-optic layer disposed on the reflective layer.

28. A device according to claims 25, 26 or 27 wherein an anti-reflective layer is provided on the exterior surface to which the p-polarized light is first incident.

29. A device according to claim 28 wherein the anti-reflective layer is in the form of a single layer of a dielectric material.

30. A device according to claim 28 wherein the anti-reflective layer is of composite form and comprises a plurality of alternate layers of two different dielectric materials.

31. A device according to claim 30 wherein the two dielectric materials are magnesium fluoride and zinc sulfide.

32. A device according to claims 25, 26 or 27 wherein the reflective layer is in the form of a single layer of a dielectric material.

33. A device according to claims 25, 26 or 27 wherein the reflective layer is of composite form and comprises a plurality of alternate layers of two different dielectric materials.

34. A device according to claim 33 wherein the two dielectric materials are magnesium fluoride and zinc sulfide.

* * * * *